(12) United States Patent
Grikstas et al.

(10) Patent No.: US 11,205,177 B2
(45) Date of Patent: Dec. 21, 2021

(54) PINPAD WITH INTEGRATED CAMERA/SCANNER AND INDEPENDENT SECURITY PROCESSING

(71) Applicant: NCR Corporation, Atlanta, GA (US)

(72) Inventors: Raymond Scott Grikstas, Lawrenceville, GA (US); Rashed Kamal, Suwanee, GA (US)

(73) Assignee: NCR Corporation, Atlanta, GA (US)

( * ) Notice: Subject to any disclaimer, the term of this patent is extended or adjusted under 35 U.S.C. 154(b) by 211 days.

(21) Appl. No.: 16/526,779

(22) Filed: Jul. 30, 2019

(65) Prior Publication Data

US 2021/0035104 A1 Feb. 4, 2021

(51) Int. Cl.
*G06Q 40/00* (2012.01)
*G06Q 20/40* (2012.01)
*G06K 7/14* (2006.01)
*G06Q 40/02* (2012.01)
*G06K 7/10* (2006.01)
*G06Q 20/34* (2012.01)

(52) U.S. Cl.
CPC ..... *G06Q 20/4012* (2013.01); *G06K 7/10722* (2013.01); *G06K 7/1413* (2013.01); *G06K 7/1417* (2013.01); *G06Q 40/025* (2013.01); *G06Q 20/34* (2013.01); *G06Q 2220/00* (2013.01)

(58) Field of Classification Search
CPC ... G06F 21/32; G06F 21/31; G06Q 20/40145; G06Q 20/40; G06Q 20/401; G06Q 20/20; G06Q 20/4014
USPC ................................ 235/375, 379, 380, 382
See application file for complete search history.

(56) References Cited

U.S. PATENT DOCUMENTS

| | | | | |
|---|---|---|---|---|
| 2011/0204140 A1* | 8/2011 | Hart | ...................... | G07F 7/1066 235/380 |
| 2012/0187187 A1* | 7/2012 | Duff | ...................... | G06Q 10/00 235/382 |
| 2013/0325718 A1* | 12/2013 | Khan | ................... | G06Q 20/385 705/44 |

* cited by examiner

*Primary Examiner* — Jamara A Franklin
(74) *Attorney, Agent, or Firm* — NCR Corporation

(57) ABSTRACT

A peripheral PINpad is connected to a host terminal. The PINpad includes an integrated camera/scanner, a secure processor, secure storage, and a network interface. The PINpad is configured to process in an independent mode of operation and a host-dependent mode of operation. Images captured by the integrated camera/scanner are decoded on the PINpad. The decoded image information, depending on a processing context, is not provided to and is not available to the host terminal. The PINpad is further configured to perform network interactions with external servers independent of the host terminal.

18 Claims, 4 Drawing Sheets

PINPAD WITH INTEGRATED CAMERA/SCANNER AND INDEPENDENT SECURITY PROCESSING

BACKGROUND

During transaction processing at a terminal, a variety of information associated with the customer may be required for a variety of reasons. Typically, the terminal includes attached peripheral devices, but transaction processing occurs on the terminal by the terminal processors. This can create security issues for a customer that needs to be verified from an identification card for a variety of reasons.

For example, when a cashier is required to verify a customer through a driver's license, the driver's license is scanned by a peripheral scanner and the details of the driver's license is sent to, viewed, and stored on the terminal. In some cases, the driver's license is taken from the customer and handled by the cashier to perform this verification. Should the customer have their identity stolen, the store and the cashier are arguably suspects because the identity card was handled by the cashier and the store had the electronic information of the identity card stored on the terminal (which may not be secure and which is connected to a network, such that the electronic information is susceptible to be stolen electronically).

Payment providers want to minimize the number of people and electronic devices that handle their clients' private information to reduce the chances of theft and fraud. However, in-person verification is one of the most-secure mechanisms available to the industry.

SUMMARY

In various embodiments, methods and a device for Personal Identification Number (PIN) pad (PINpad) independent security processing are presented. The PINpad includes an integrated scanner/camera and independent security processing.

According to an embodiment, a method for PINpad independent security processing is provided. An image is received from a camera that is integrated into a PINpad during a transaction that is being processed on a host terminal. The PINpad decodes the image into decoded information. The PINpad establishes a network connection to an external server independently of the host terminal and the PINpad interacts with the external service using at least a portion of the decoded information. The PINpad receives an indication from the external server based on the interaction over the network connection, and the PINpad provides the indication to the host terminal for continued processing of the transaction on the host terminal.

DETAILED DESCRIPTION

Figure 1:
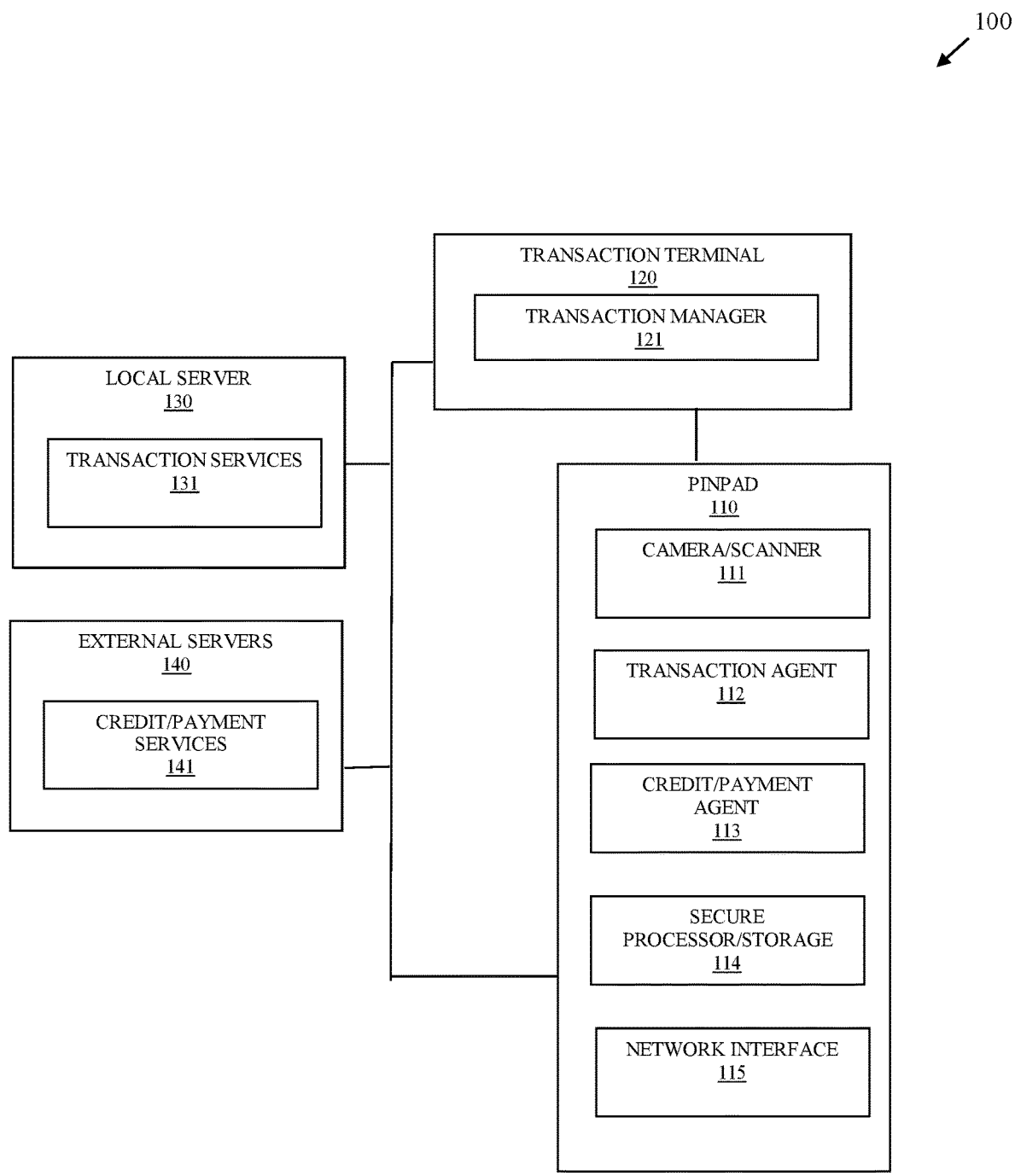
FIG. 1 is a diagram of a system for PINpad independent security processing, according to an example embodiment.

FIG. 1 is a diagram of a system 100 for PINpad independent security processing, according to an example embodiment, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of PINpad independent security processing, presented herein and below.

The system 100 includes a PINpad 100, a transaction terminal 120, a local server 130, and a plurality of external servers 140. The PINpad 110 includes a secure processor/storage 114, an integrated camera/scanner 111, a network interface 115, a transaction agent 112, and credit/payment agent 113.

The transaction terminal 120 includes a transaction manager 121. The local server includes transaction services 131. The external servers include a variety of credit/payment services 141.

Each device 110, 120, 130, and 140 include processors and non-transitory computer-readable storage media having executable instructions. The executable instructions when executed on the corresponding devices by the corresponding processors perform the processing discussed herein with respect to the transaction agent 112, the credit/payment agent 113, the transaction manager 121, the transaction services 131, and the credit/payment services 141.

The PINpad 110 is a peripheral device to the transaction terminal 120 and can operate as a slave to the host transaction terminal 120 in a terminal transaction mode and can operated independent of the terminal 120 in an independent mode of operation.

Conventionally, a PINpad is used for secure cryptographic processing in a slave to the host terminal 120. When a PIN is needed (typically for payment during a transaction but can be to lookup a customer loyalty account as well), the customer enters a PIN or identifying number and the PINpad may or may not encrypted the PIN and send it back to the host terminal 120 for continued transaction processing. This conventional approach is not changed and is still available with the teachings presented herein and below. However, the PINpad 110 discussed herein can, in some instances, change the processing associated with the terminal transaction mode of operation and provides a different and new independent mode of operation as well.

The PINpad 110 includes an integrated camera/scanner 110. This is built into the motherboard of the PINpad 110 and includes image capture capabilities as well as barcode and/or Quick Response (QR) scanning capabilities from any captured image. Moreover, the PINpad 110 includes its own network interface 115 that permits the PINpad 110 to make an independent network connection that is independent of the host terminal 120, such that the host terminal 120 does not have access to and cannot see or discover what network connections and network activity is being processed by the PINpad 110. Additionally, the PINpad 110 includes a peripheral port connection (not shown in FIG. 1) directly to the host terminal 120.

In addition to performing secure cryptographic PIN operations, via the secure processor/storage 114 and during the transaction mode of operation for the PINpad 110, the PINpad 110 performs a variety of additional independent processing in the independent mode of operation and performs enhanced processing during the transaction mode of operation that are not solely associated with the secure cryptographic PIN operations. This processing (independent mode and enhanced transaction mode) is performed by the transaction agent 112 and the credit/payment agent 113. Furthermore, during a transaction mode of operation, the PINpad 110 may initiated a separate independent mode of operation.

A variety of example processing scenarios are now discussed for purposes of illustrating the enhanced transaction mode of operation and the independent mode of operation for the PINpad 110.

When transaction manager 121 reaches a point during a transaction for which the identity of a customer needs to be verified through presentation of an identity card, the customer places the identity card in front of the integrated camera/scanner 111 of the PINpad 110. Any QR code or barcode associated with the identity card is read/decoded by the transaction agent from the image captured of the identity card. If the decoded information is needed by an external payment provider, the credit/payment agent 113 initiates an independent mode of operation on the PINpad 110 and sends that in an encrypted format through the network interface 115 to the appropriate credit/payment service 141. A verification code may be received back from the credit/payment service 141, which the credit/payment agent 113 relays to the transaction agent 112. The transaction agent 112 operating in the transaction mode of operation, relays the verification code to the transaction manager 121, and the identity of the customer is confirmed for continued processing of the transaction by the transaction manager 121. At no point, was any of the decoded identity card information provided from the PINpad 110 to the host terminal 120. Moreover, at no point does the host terminal 120 have access to the decoded identity card information. The decoded identity card information resides in the secure storage 114 and/or memory of the PINpad and is never available to the host terminal 120. This eliminates a major security hole in conventional transactions because in conventional transactions the PINpad plays no role whatsoever in the customer verification provided through an identity card; rather a scanner of the terminal 120 scans, decodes, and provides the decoded information on the host terminal 120. The above-referenced processing can also eliminate the needed of a cashier to physically handle a customer identification card during identity card verification.

In an embodiment, the transaction agent 112, the credit/payment agent 113, and the credit/payment services 141 are used when a customer applies for credit at terminal 120 and/or requests an increase in a credit limit of an existing credit account held by the customer. The terminal 120 is not involved in this process other than for the transaction manager 121 to receive a verification from agent 112 that credit was established, increased, or denied for the customer performing the transaction at the terminal 120.

In another situation, the PINpad 110 operates in an independent mode of operation as a limited-function transaction terminal 120. This requires no interaction with the terminal 120; rather, the agent 112 decodes item barcodes captured by the integrated front-facing camera/scanner 111 uses network interface 115 to connected to transaction services 131 and performs independent transaction processing similar to what is done by transaction manager 121. However, all transaction processing is performed independent of terminal 120 and exclusively on the PINpad 110. In this situation, the customer may or may not have a display to see the item descriptions as they are being scanned by camera/scanner 111. In one case, the PINpad 110 also includes a small LED display for presenting the item descriptions. In one case, the PINpad 110 uses the display and/or customer-facing display of terminal 120 (through its peripheral connection to terminal 120). Payment for the items occurs through credit card payments and without cash, making this transaction processing limited as compared to what can be done on terminal 121. This may be useful when Self-Service Terminals (SSTs) 120 are experiencing long queues and the Point-Of-Sale (POS) terminals 120 are only partially staffed with cashiers based on available employees, such that the non-staffed POS terminals can be opened up for credit only transaction processing through utilization of those POS terminals 120 integrated and novel PINpad 110. The above processing may be useful in small stores that experience heavy traffic, such as airports, the PINpads 110 can be deployed to allow customer grab and go, such that the customers do not have to wait on the cashier as she assist cash paying customers.

In an embodiment, the front-facing camera/scanner 111 may also be used a security or auditing mechanism that captures video during transaction processing and stores in the storage 114. The video may be stored with date and time stamps and transaction identifiers and streamed during low volume to the local server 130 for storage, indexing, and evaluation. This would depend on the angle of the camera 111 and its field of view.

In an embodiment, the PINpad 110 includes an integrated microphone that captures audio for security or auditing that is stored in the storage 114. This audio data can be subsequently streamed with metadata identifiers similar to the video to the local server 130 at times when the PINpad 110 is deemed to have been inactive for a configured period of time.

In an embodiment, the network interface 115 is ethernet.

In an embodiment, the network interface 115 includes a wireless transceiver for wireless network connections (BlueTooth®, Near Field Communication (NFC), wireless beacons, Wi-Fi, etc.).

In an embodiment, the transaction terminal 120 is an SST, a POS terminal, an Automated Teller Machine (ATM), or a kiosk.

These and other embodiments are now discussed with reference to the FIGS. 2-4.

These embodiments and other embodiments are now discussed with reference to the FIGS. 2-4.

Figure 2:
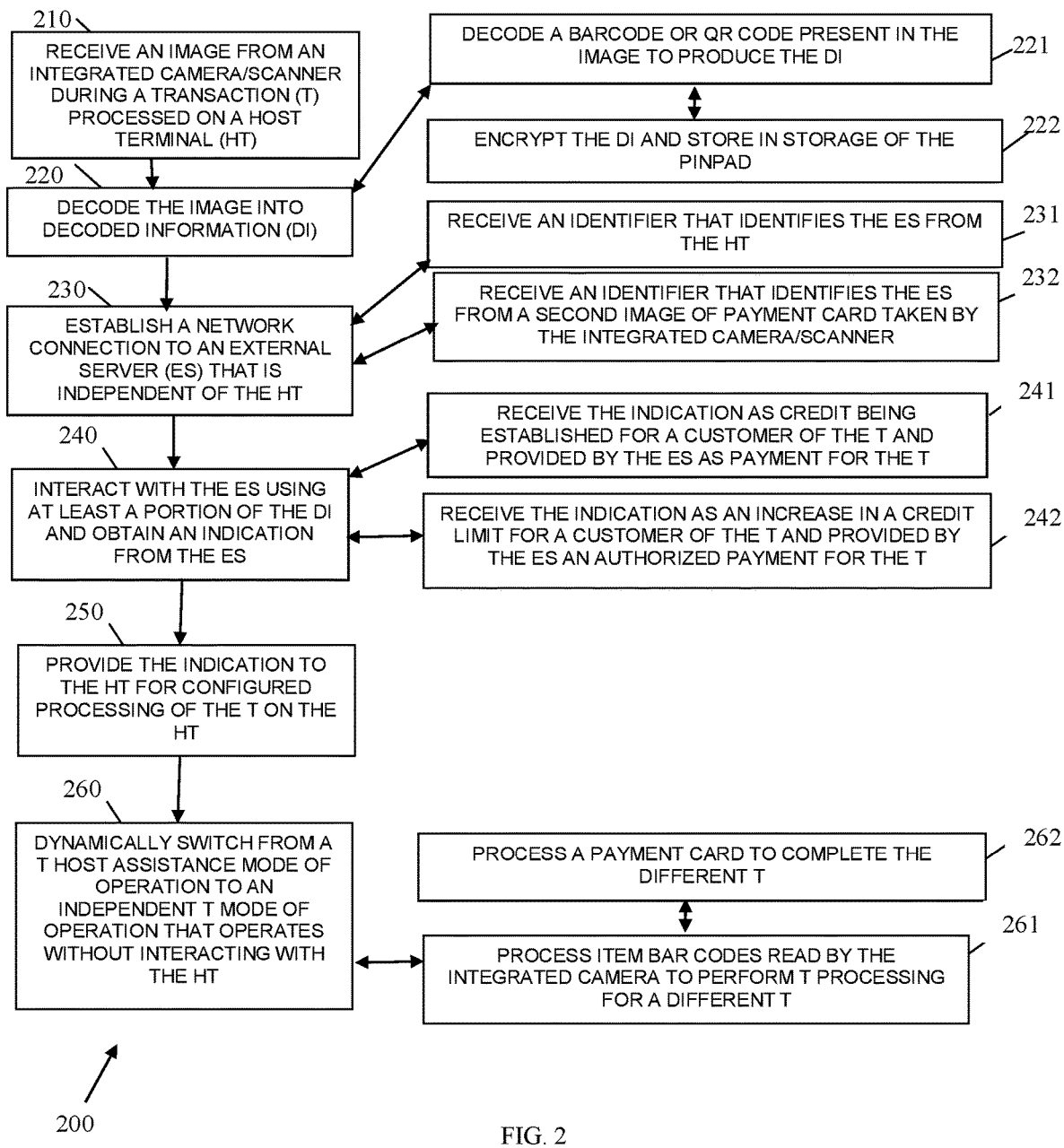
FIG. 2 is a diagram of a method for PINpad independent security processing, according to an example embodiment.

FIG. 2 is a diagram of a method 200 for PINpad independent security processing, according to an example embodiment. The software module(s) that implements the method 200 is referred to as a "PINpad controller." The PINpad controller is implemented as executable instructions programmed and residing within memory and/or a non-transitory computer-readable (processor-readable) storage medium and executed by one or more processors of a PINpad 110. The processor(s) of the device that executes the PINpad controller are specifically configured and programmed to process the PINpad controller. The PINpad controller has access to one or more network connections during its processing. The network connections can be wired, wireless, or a combination of wired and wireless.

In an embodiment, the PINpad 110 executes the PINpad controller. In an embodiment, the PINpad 110 is an integrated secure peripheral of the transaction terminal 120. In an embodiment, the terminal 120 is an SST, a POS terminal, an ATM, or a kiosk.

In an embodiment, the PINpad controller is all or some combination of: transaction agent 112 and/or the credit/payment agent 113.

At 210, the PINpad controller receives an image from an integrated camera/scanner during a transaction processed on a host terminal.

At 220, the PINpad controller decodes the image into decoded information.

In an embodiment, at 221, the PINpad controller decodes a barcode or a QR code present in the image to produce the decoded information.

In an embodiment of 221 and at 222, the PINpad controller encrypts the decoded information in storage of the PINpad.

At 230, the PINpad controller establishes a network connection to an external server that is independent of the host terminal. That is, the PINpad has its own network interface that is independent of the host terminal.

In an embodiment, at 231, the PINpad controller receives an identifier that identifies the external server from the host terminal. The host terminal provides the external server identifier so that the PINpad controller can identify and connected to the network-service associated with the external server.

In an embodiment, at 231, the PINpad controller receives an identifier that identifies the external service from a second image of a payment card taken by the integrated camera/scanner. Here, the customer provides the payment card for capturing the image and the PINpad controller performs Optical Character Recognition (OCR) to identify the network-based payment service associated with the payment card image.

At 240, the PINpad controller interacts with the external server using at least a portion of the decoded information and obtains back an indication from the external server.

In an embodiment, at 241, the PINpad controller receives the indication as credit being established for a customer of the transaction and provided by the external server as payment of the transaction at the host terminal.

In an embodiment, at 242, the PINpad controller receives the indication as an increase in a credit limit for a customer of the transaction and provided by the external server as an authorized payment for the transaction at the host terminal.

At 250, the PINpad controller provides the indication to the host terminal over a peripheral connection. The host terminal uses the indication to continue processing the transaction on the host terminal.

In an embodiment, at 260, the PINpad controller dynamically switches from a transaction host assistance mode of operation to an independent transaction mode of operation that operates without interaction with the host terminal.

In an embodiment of 260 and at 261, the PINpad controller processes item barcodes read by the integrated camera to perform transaction processing entirely on the PINpad for a completely different transaction from that which was associated with the host terminal.

In an embodiment of 261 and at 262, the PINpad controller processes a payment card to complete the different transaction. An image of the payment card received from the integrated camera.

Figure 3:
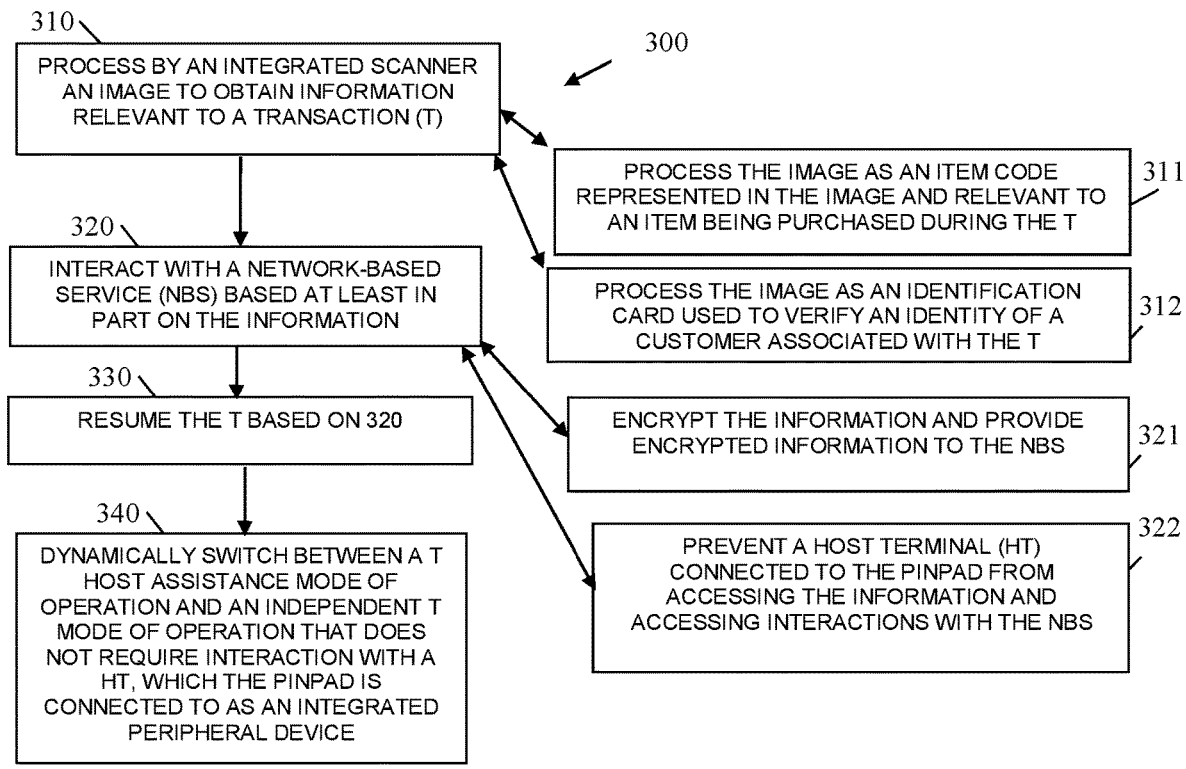
FIG. 3 is a diagram of another method for PINpad independent security processing, according to an example embodiment.

FIG. 3 is a diagram of another method 300 for PINpad independent security processing according to an example embodiment. The software module(s) that implements the method 300 is referred to as a "PINpad transaction manager." The PINpad transaction manager is implemented as executable instructions programmed and residing within memory and/or a non-transitory computer-readable (processor-readable) storage medium and executed by one or more processors of a PINpad 110. The processors that execute the PINpad transaction manager are specifically configured and programmed to process the PINpad transaction manager. The PINpad transaction manager has access to one or more network connections during its processing. The network connections can be wired, wireless, or a combination of wired and wireless.

In an embodiment, the PINpad 110 executes the PINpad transaction manager. In an embodiment, the PINpad 110 is an integrated and secured peripheral of a transaction terminal 120 (secured within the housing of terminal 120). In an embodiment, the terminal 120 is an SST, a POS terminal, an ATM, or a kiosk.

In an embodiment, the PINpad transaction manager is all of or some combination of: the transaction agent 112, the credit/payment agent 113, and/or the method 200.

The PINpad transaction manager presents another and, in some ways, enhanced processing perspective of the method 200 discussed above.

At 310, the PINpad transaction manager uses an integrated scanner of the PINpad to process an image and obtain information relevant to a transaction. The transaction can have originated on the host terminal or originated entirely on the PINpad (as discussed above).

In an embodiment, at 311, the PINpad transaction manager processes the image as an item coded represented in the image and relevant to an item being purchased during the transaction. In this case, the transaction originated and is being entirely processed on the PINpad.

In an embodiment, at 312, the PINpad transaction manager processes the image as an identification card used to verify an identify of a customer associated with the transaction. In this case, the transaction originated on the host terminal and is being controlled by the host terminal.

At 320, the PINpad transaction manager interacts with a network-based service based at least in part on the information obtained from the scanner at 310.

In an embodiment, at 321, the PINpad transaction manager encrypts the information and provides encrypted information to the network-based service.

In an embodiment, at 322, the PINpad transaction manager prevents the host terminal (which is connected to the PINpad) from accessing any of the information and from accessing interactions occurring within the network-based service.

At 330, the PINpad transaction manager resumes the transaction based on interactions at 320. This may mean providing the host terminal with a verification or other information provided by the network-based service so that the host terminal can complete the transaction. Alternatively, this may mean scanning a next item code from the integrated scanner for a transaction being processed entirely on the PINpad or obtaining and processing payment to complete that transaction on the PINpad.

According to an embodiment, at 340, the PINpad transaction manager dynamically switches between a transaction host assistance mode of operation and an independent transaction mode of operation that does not require interaction with the host terminal. Again, the PINpad is connected to the host terminal as a peripheral PINpad device.

Figure 4:
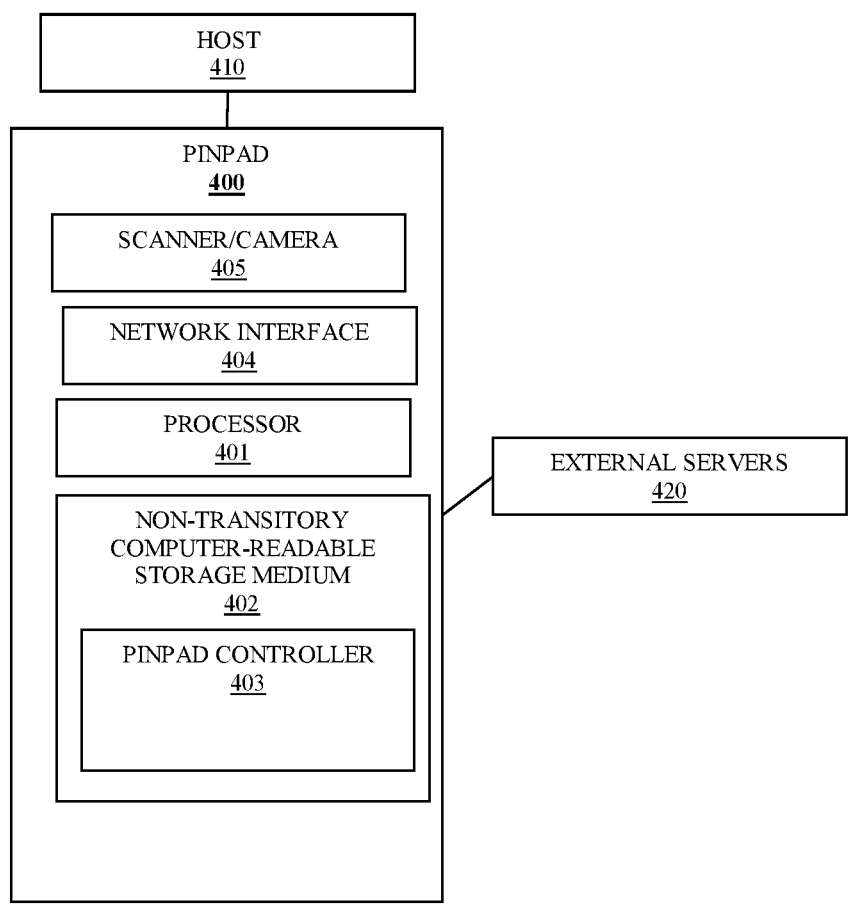
FIG. 4 is a diagram of PINpad with an integrated camera/scanner having independent security processing, according to an example embodiment.

FIG. 4 is a diagram of a PINpad 400, according to an example embodiment. The PINpad 400 includes a variety of hardware components and software components. The software components of the PINpad 400 are programmed and reside within memory and/or a non-transitory computer-readable medium and execute on one or more processors of the PINpad 400. The PINpad 400 communicates over one or more networks, which can be wired, wireless, or a combination of wired and wireless.

In an embodiment, the PINpad 400 implements, inter alia, the processing described above with the FIGS. 1-3.

The PINpad 400 includes a security processor 401, secure non-transitory computer-readable storage 402 having executable instructions representing a PINpad controller 403. The PINpad 400 also includes a network interface 404 and an integrated camera/scanner 405.

In an embodiment, the camera/scanner 405 is integrated into a motherboard of the PINpad 400.

The PINpad 400 includes a peripheral connection to a host terminal 410. In an embodiment, the host terminal 410 is: an SST, a POS terminal, an ATM, or a kiosk.

The PINpad 400 is configured to establish network connections with external servers 420 independent of the host 410 through the network interface 404.

In an embodiment, the network connections through the network interface 404 can be wired ethernet, Wi-Fi, Bluetooth®, NCR, and/or wireless beacons. In an embodiment, the PINpad 400 includes both a wired network interface 404 and at least one additional wireless network transceiver interface 404.

The PINpad controller 403 when executed from the non-transitory computer-readable storage medium 402 on the processor 401 is configured to cause the processor 401 to: 1) process a first image captured from the integrated camera 405 during a first mode of operation; 2) connect to a first service using the network interface 404 during the first mode of operation to verify a customer on behalf of a host terminal 410 using information obtained from the first image, wherein the PINpad 400 has a peripheral connection to the host terminal 410, and the host terminal 410 processing a first transaction on behalf of the customer; 3) provide an indication received from the first service to the host terminal 410 to continue the first transaction on the host terminal 410; 4) process second images captured from the integrated camera 405 during a second mode of operation; 5) connect to a second service using the network interface 404 during the second mode of operation to perform item lookup and item prices for items associated with the second images during a second transaction; 6) obtain a third image from the integrated camera 405 during the second mode of operation representing a payment card for a payment of the second transaction; 7) connect to a payment service using the network interface 404 during the second mode of operation to perform payment processing using the payment card to complete the second transaction on the PINpad 400.

In an embodiment, the PINpad controller 403 when executed from the non-transitory computer-readable storage medium 402 on the processor 401 is configured to: cause the processor 401 to: prevent the host terminal 410 from accessing the first image, the information obtained from the first image, and a network connection associated with the first service.

In an embodiment, the PINpad controller 403 when executed from the non-transitory computer-readable storage medium 402 on the processor 401 is configured to: provide the indication during the first mode of operation as a verification that the customer has established a new credit account for a transaction payment of the first transaction or as a second verification that an existing credit account of the customer has an increased credit limit sufficient to cover the transaction payment.

In an embodiment, the PINpad controller 403 performs the processing discussed above with the FIGS. 1-3.

It is to be noted that the PINpad 400 and PINpad 110 (including the processing discussed in methods 200 and 300) are enhanced to perform the processing discussed herein and above. Existing functionality and operation associated with conventional PINpads are not lost and are still processed with the new PINpads 400 and 110; however, the new PINpads 400 and 110 include the integrated scanners/cameras 405 and 111 and the enhanced processing as described herein.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
receiving, by an integrated camera of a Personal Identification Number (PIN) pad (PINpad), an image during a transaction being processed on a host terminal;
decoding, by a secure processor of the PINpad, the image into decoded information;
establishing, by the secure processor of the PINpad, a network connection to an external server independently of the host terminal;
interacting, by the secure processor of the PINpad with the external server using at least a portion the decoded information and obtaining an indication from the external server;
providing, by the secure processor of the PINpad, the indication to the host terminal for continued processing of the transaction on the host terminal; and
dynamically switching, by the secure processor of the PINpad, from a transaction host assistance mode of operation to an independent transaction mode of operation that operates without interacting with the host terminal.

2. The method of claim 1, wherein dynamic switching further includes processing item bar codes read by the integrated camera to perform transaction processing for a different transaction.

3. The method of claim 2, wherein processing further includes processing a payment card with a payment service to complete the different transaction on the PINpad.

4. The method of claim 1, wherein decoding further includes decoding a barcode or Quick Response (QR) present in the image to produce the decoded information.

5. The method of claim 4, wherein decoding further includes encrypting the decoded information and storing in storage of the PINpad.

6. The method of claim 1, wherein establishing further includes receive an identifier that identifies the external server from the host terminal.

7. The method of claim 1, wherein establishing further includes receive an identifier that identifies the external server from a second image of a payment card taken by the integrated camera/scanner.

8. The method of claim 1, wherein interacting further includes receiving the indication as credit being established for the customer of the transaction and provided by the external server as a payment for the transaction.

9. The method of claim 1, wherein interacting further includes receiving the indication as an increase in a credit limit for the customer of the transaction and provided by the external server as an authorized payment for the transaction.

10. A method, comprising:
processing, by an integrated scanner of a Personal Identification Number (PIN) pad (PINpad), an image to obtain information relevant to a transaction;
interacting, by a secure processor of the PINpad, with a network-based service based at least in part on the information, wherein interacting further includes preventing a host terminal connected to the PINpad from accessing the information and accessing interactions with the network-based service; and
resuming, by the secure processor of the PINpad, the transaction based on the interacting.

11. The method of claim 10 wherein processing further includes processing the image as an item code represented in the image and relevant to an item being purchased during the transaction.

12. The method of claim 10, wherein processing further includes processing the image as an identification card used to verify an identity of a customer associated with the transaction.

13. The method of claim 10, wherein interacting further includes encrypting the information and providing encrypted information to the network-based service.

14. The method of claim 10 further comprising, dynamically switching, by the secure processor of the PINpad between a transaction host assistance mode of operation and an independent transaction mode of operation that does not require interaction with a host terminal that the PINpad is connected to as an integrated peripheral device.

15. A Personal Identification Number (PIN) pad (PINpad), comprising:
an integrated camera;
a network interface;
a secure processor; and
a non-transitory computer-readable storage medium having executable instructions representing a PINpad controller;
the PINpad controller when executed by the secure processor from the non-transitory computer-readable storage medium causes the secure processor to:
process a first image captured from the integrated camera during a first mode of operation;
connect to a first service using the network interface during the first mode of operation to verify a customer on behalf of a host terminal using information obtained from the first image, wherein the PINpad has a peripheral connection to the host terminal, and the host terminal processing a first transaction on behalf of the customer;
provide an indication received from the first service to the host terminal to continue the first transaction on the host terminal;
process second images captured from the integrated camera during a second mode of operation;
connect to a second service using the network interface during the second mode of operation to perform item lookup and item prices for items associated with the second images during a second transaction;
obtain a third image from the integrated camera during the second mode of operation representing a payment card for a payment of the second transaction;
connect to a payment service using the network interface during the second mode of operation to perform payment processing using the payment card to complete the second transaction on the PINpad.

16. The PINpad of claim 15, wherein host terminal is: a Self-Service Terminal (SST), a Point-Of-Sale (POS) terminal, an Automated Teller Machine (ATM), or a kiosk.

17. The PINpad of claim 15, wherein the PINpad controller when executed by the secure processor from the non-transitory computer-readable storage medium further causes the secure processor to: prevent the host terminal from accessing the first image, the information obtained from the first image, and a network connection associated with the first service.

18. The PINpad of claim 15, wherein PINpad controller when executed by the secure processor from the non-transitory computer-readable storage medium further causes the secure processor to: provide the indication during the first mode of operation as a verification that the customer has established a new credit account for a transaction payment of the first transaction or as a second verification that an existing credit account of the customer has an increased credit limit sufficient to cover the transaction payment.

* * * * *